United States Patent [19]
LaBerge

[11] Patent Number: 5,822,549
[45] Date of Patent: Oct. 13, 1998

[54] COMPUTER SYSTEM AND BUS CONTROLLER FOR CONTROLLING ACCESS TO A COMPUTER BUS

[75] Inventor: Paul A. LaBerge, Shoreview, Minn.

[73] Assignee: Micron Electronics, Inc., Nampa, Id.

[21] Appl. No.: 680,157

[22] Filed: Jul. 15, 1996

[51] Int. Cl.$^6$ .............................. G06F 13/14; G06F 13/38
[52] U.S. Cl. .......................... 395/287; 395/288; 395/309
[58] Field of Search ..................... 395/287, 288, 395/293, 294, 309, 728, 729

[56] References Cited

U.S. PATENT DOCUMENTS 5,581,782  12/1996  Sarangdhar et al. ..................... 395/800

OTHER PUBLICATIONS

M. Morris Mano, Computer System Architecture (Second Edition), Prentice–Hall, Inc.1982 pp. 406–415 and pp. 454–462.

Primary Examiner—Ayaz R. Sheikh
Assistant Examiner—Jigar Pancholi
Attorney, Agent, or Firm—Seed and Berry LLP

[57] ABSTRACT

A bus controller controls access to a computer bus by a plurality of bus requesters. The bus controller activates a priority bus request line on the computer bus regardless of which of plural priority bus agents desires to transmit a transaction on the computer bus. The bus controller receives an I/O request signal from a bus agent and determines whether the priority bus request line is in an active state. If the priority bus request line is not in the active state, then the bus controller activates the priority bus request line in response to the I/O request signal. If the priority bus request line is already in the active state, then the bus controller leaves the priority bus request line in the active state for a time period sufficient to enable the bus agent to transmit a transaction on the computer bus. In addition, the bus controller transmits an I/O grant signal to the bus agent to enable the bus agent to transmit the transaction on the computer bus. Controlling the priority bus request line solely with the bus controller enables the control of the processor bus to switch between priority bus agents without having to deactivate and reactivate the priority bus request line.

11 Claims, 4 Drawing Sheets

COMPUTER SYSTEM AND BUS CONTROLLER FOR CONTROLLING ACCESS TO A COMPUTER BUS

TECHNICAL FIELD

The present invention relates to computer bus control, and more particularly, to apportioning computer bus bandwidth among a plurality of bus requesters.

BACKGROUND OF THE INVENTION

A computer system includes a set of interconnected components or modules of three basic types: central processing unit (CPU), memory, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

The process of allocating time or bandwidth on a computer bus among plural bus agents is known as arbitration. Typically, an arbiter grants access for a predetermined time period or bandwidth window to whichever bus agent first requests use of the bus. If plural bus agents have requests for use of the bus pending, then the arbiter typically employs a rotational priority or round-robin scheme to share the bus among the bus agents. In a rotational priority scheme, the use of the bus is given for one bandwidth window to each bus agent in sequential order. After the last bus agent uses the bus, then the use of the bus is given back to the first bus agent and the rotational sequence continues.

In many computer systems, such as the Intel P6 computer system, the bus agents can be either symmetric bus agents or priority bus agents. As the name suggests, bus requests from the priority bus agents have preference over any new bus requests from the symmetric bus agents. In the Intel P6 computer system, from one to four P6 processors are coupled to a processor bus, with each P6 processor being a symmetric bus agent. In addition, one or more bus controllers couple memory and input/output (I/O) devices to the processor bus, with each bus controller being a priority bus agent. The P6 processors are referred to as symmetric bus agents because they are arbitrated on a strict rotational priority scheme.

The prior art computer system 10 shown in FIG. I includes a multiprocessor system architecture in which first through fourth computer processors 14, 16, 18, 20 are each coupled to a processor bus 12. The computer processors 14–20 are known as symmetric bus agents, as discussed above. The computer system 10 also includes two priority bus agents: a bus agent 22 and a bus controller 24. Coupled to the bus agent 22 is a Peripheral Component Interconnect (PCI) bus 26 which is coupled to a hard drive 28 and a video controller 30. Coupled to the bus controller 24 is a main memory 32. The hard drive 28, video controller 30, and main memory 32 are bus requesters that generate bus requests for use of the processor bus 12.

The bus controller 24 includes an external arbiter 34 that arbitrates between requests for access to the processor bus 12. Such bus requests can come from the main memory 32 directly to the bus controller 24 or from the hard drive 28 and the video controller 30 to the bus agent 22 via the PCI bus 26. In response to receiving a bus request from the PCI bus 26, the bus agent 22 transmits an I/O request signal to the bus controller 24. The external arbiter 34 of the bus controller 24 performs arbitration between the I/O request signal from the bus agent 22 and any other bus requests, such as from the main memory 32. If the external arbiter 34 selects the I/O request signal from the bus agent 22, then the external arbiter transmits an I/O grant signal to the bus agent 22. Upon receiving the I/O grant signal, the bus agent 22 monitors a priority bus request line (BPRI#) of the processor bus 12 to determine whether the processor bus is available. If the BPRI# line is inactive when the I/O grant signal is received from the bus controller 24, then the bus agent activates the BPRI# line. When the BPRI# line is activated the bus agent 22 can transmit on the processor bus 12 a bus transaction (e.g., read or write) corresponding to the selected bus request from the PCI bus 26. An active BPRI# line informs the symmetric bus agents (i.e., processors 14–20) that they cannot transmit any bus transactions on the processor bus 12 until the BPRI# line is deactivated.

When the bus agent 22 is ready to finish transmitting transactions on the processor bus 12, the bus agent releases the I/O request signal and the BPRI# line to enable another bus agent to access the processor bus 12. For example, if the bus controller 24 is ready to transmit a transaction corresponding to a bus request received from the main memory 32, then the bus controller determines whether the BPRI# line is active. If the BPRI# line is not active, then the bus controller 24 activates the BPRI# line and transmits its transaction on the processor bus 12. As such, when switching between priority bus agents that are accessing the processor bus 12, the prior art system requires the first priority bus agent to deactivate the BPRI# line and the second priority bus agent must check to see if the BPRI# line is inactive, and then activate the BPRI# line.

SUMMARY OF THE INVENTION

The present invention is directed to a method, system, and bus controller for controlling access to a computer bus. The invention differs from prior art methods in computer systems by activating a priority bus request line on the computer bus from a single bus controller regardless of which of plural priority bus agents desires to transmit a transaction on the computer bus. In particular, the method includes receiving at the bus controller an I/O request signal from a bus agent. The bus controller determines whether the priority bus request line is in an active state. If the priority bus request line is not in the active state, then the bus controller activates the priority bus request line in response to the I/O request signal. If the priority bus request line is already in the active state, then the bus controller leaves the priority bus request line in the active state for a time period sufficient to enable the bus agent to transmit a transaction on the computer bus. In addition, the bus controller transmits an I/O grant signal to the bus agent to enable the bus agent to transmit the transaction on the computer bus. Controlling the priority bus request line solely with the bus controller enables the control of the processor bus to switch between priority bus agents without having to deactivate and reactivate the priority bus request line.

The bus controller of the present invention includes a first I/O request port for receiving an I/O request signal from a first bus agent. The bus controller also includes a priority bus request port for activating a priority bus request line of the computer bus. Further, the bus controller includes a first I/O grant port for transmitting an I/O grant signal to the first bus agent in response to the I/O request signal from the first bus agent. In addition, the bus controller includes a bus arbiter for transmitting the I/O grant signal to the first bus agent via the I/O grant port. Also, the bus arbiter activates the priority bus request line via the priority bus request port in response to receiving the I/O request signal from the first bus agent at the first I/O port. This contrasts with prior art bus controllers that do not activate the priority bus request line in response to an I/O request signal received from a bus agent.

DETAILED DESCRIPTION OF THE INVENTION

Figure 1:
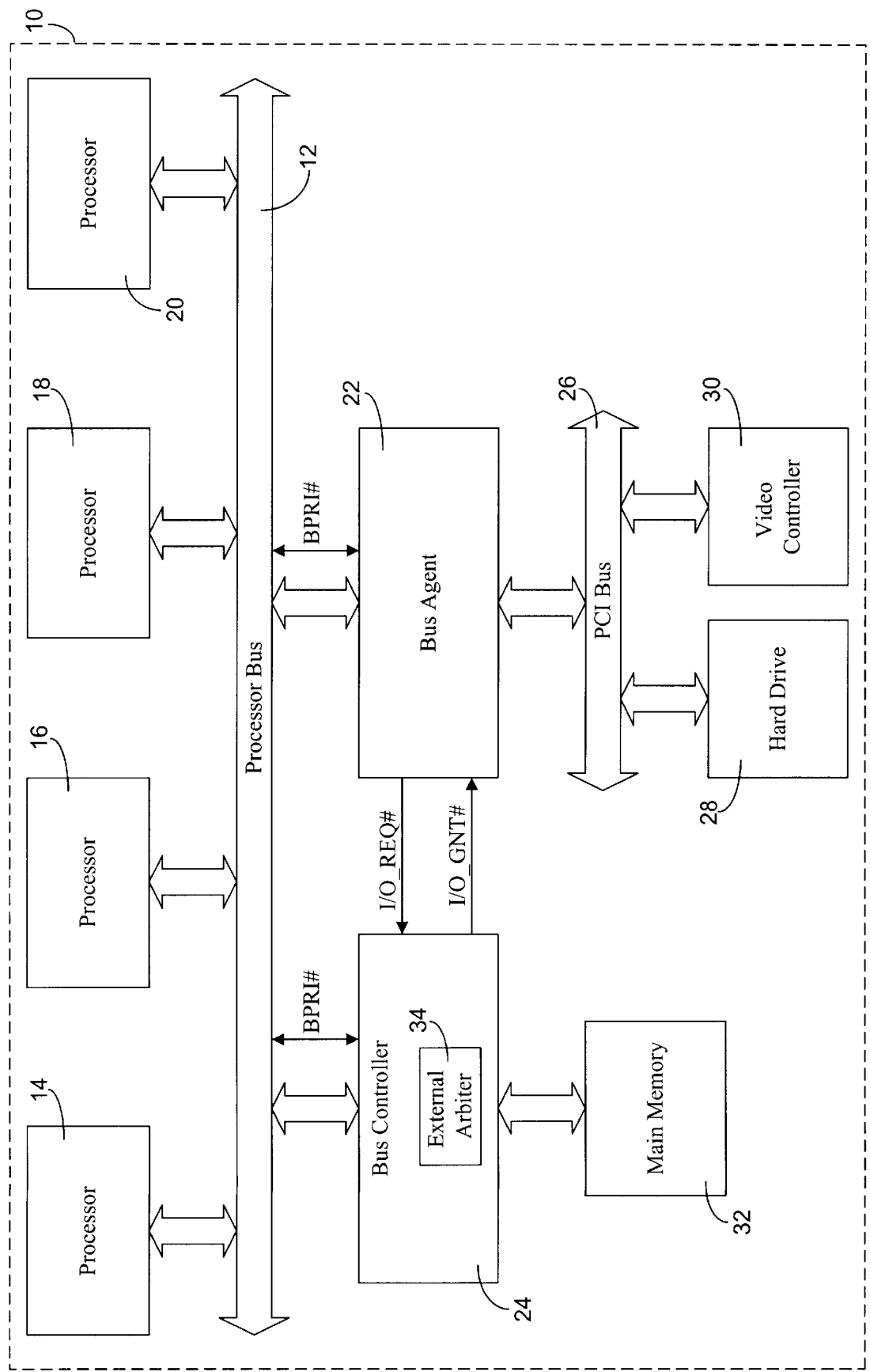
FIG. 1 is a block diagram of a prior art computer system.
Figure 2:
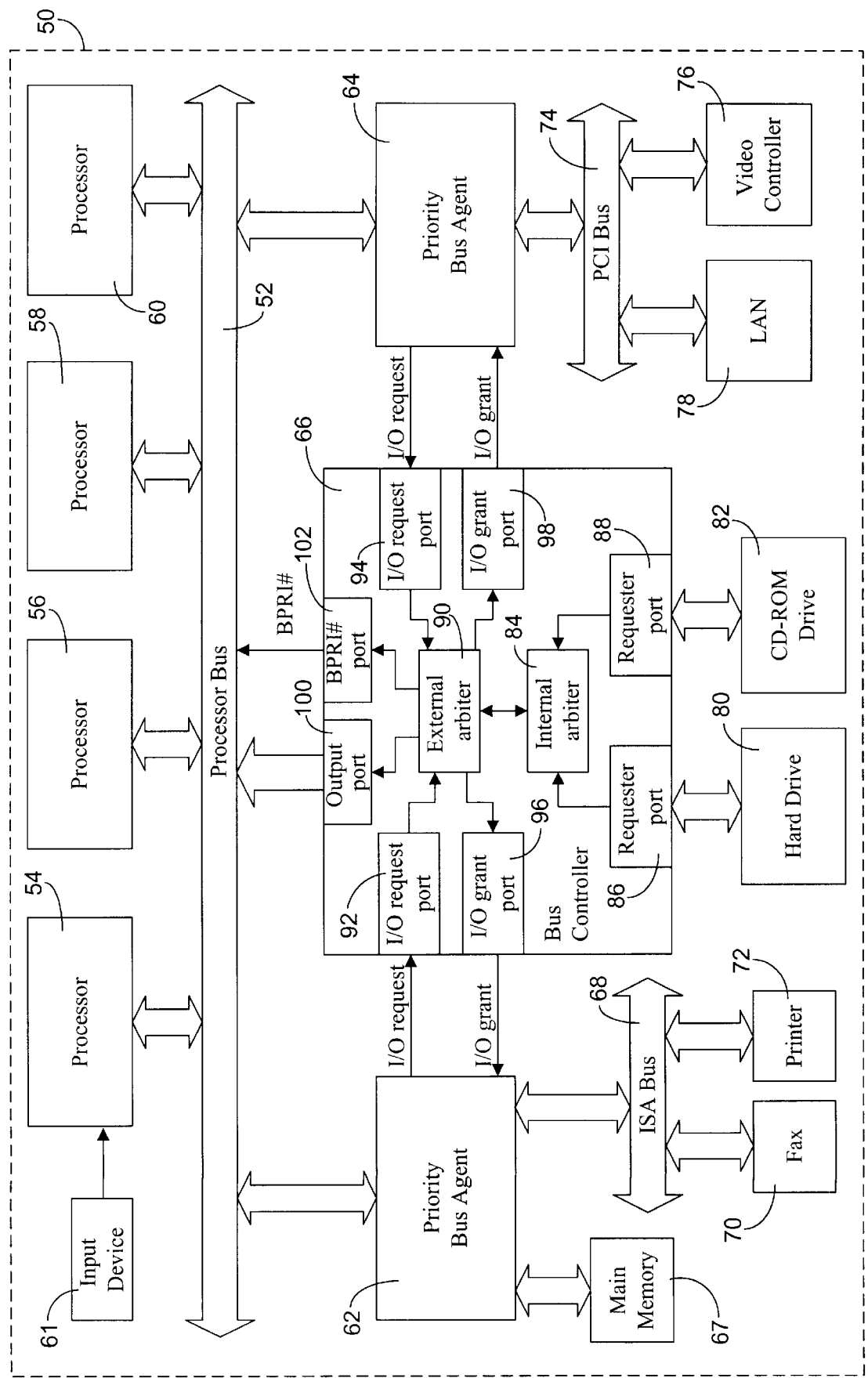
FIG. 2 is a block diagram of a computer system according to the present invention.

Shown in FIG. 2 is a preferred embodiment of a computer system 50 that controls access to a processor bus 52 according to the present invention. The computer system 50 includes a multiprocessor system architecture in which first through fourth computer processors 54, 56, 58, 60 are each coupled to the processor bus 52. The computer processors 54–60 each request use of the processor bus 52 as necessary and are known as symmetric bus agents. Each of the processors 54–60 can be any of numerous known computer processors, such as the Intel P6 processor. It will be appreciated that the invention also is applicable to computer systems employing more or fewer processors. One or more input devices 61, such as a keypad or mouse, are coupled to the first processor 54 to allow data to be input to the computer system 50.

The computer system 50 includes three priority bus agents: a first bus agent 62, a second bus agent 64, and a bus controller 66. Coupled to the first priority bus agent 62 are two bus requesters: a main memory 67 and an Industry Standard Architecture (ISA) bus 68. Coupled to the ISA bus 68 are two bus sub-requesters: a fax 70 and a printer 72. Coupled to the second priority bus agent 64 via a Peripheral Component Interconnect (PCI) bus 14 are two more bus requesters: a video controller 76 and a local area network (LAN) 78. Directly coupled to the bus controller 66 are two more bus requesters: a hard drive 80 and a CD-ROM drive 82. Each bus requester is a computer system element or module that requests use of the processor bus 12. It will be appreciated that the particular modules shown as bus requesters 67–82 are exemplary only and numerous other types and numbers of bus requesters could be employed without departing from the invention.

The bus controller 66 includes an internal bus arbiter 84 that arbitrates between bus requests received from the hard drive 80 and the CD-ROM drive 82. The internal bus arbiter 84 receives bus requests from the hard drive 80 via a first requester port 86 and receives bus requests from the CD-ROM drive 82 via a second requester port 88. The internal bus arbiter 84 can employ any well known arbitration algorithm to select one of the bus requests from the hard drive 80 and the CD-ROM drive 82 for transmission on the processor bus 52.

The bus controller 66 also includes an external bus arbiter 90 that arbitrates between bus requests from the first priority bus agent 62, the second priority bus agent 64, and the internal bus arbiter 84. Coupled to the external arbiter 90 is a first I/O request port 92 that receives an I/O request signal from the first priority bus agent 62 whenever the first priority bus agent receives a bus request from one of the bus requesters 70–72 via the ISA bus 68. Similarly, also coupled to the external arbiter 90 is a second I/O request port 94 that receives an I/O request signal from the second priority bus agent 64 whenever the second priority bus agent receives a bus request from one of the bus requesters 76–78 via the PCI bus 74. The external arbiter 90 arbitrates between the I/O request signal received via the first I/O request port 92, the I/O request signal received from the second I/O request port 94, and the bus request selected by the internal arbiter 84. If the external arbiter 90 selects the I/O request signal received via the first I/O request port 92, then the external arbiter sends an I/O grant signal to the first priority bus agent 62 via a first I/O grant port 96. Similarly, if the external arbiter 90 selects the I/O request signal received via the second I/O request port 94, then the external arbiter sends an I/O grant signal to the second priority bus agent 64 via a second I/O grant port 98. If the external arbiter 90 selects the bus request from the internal arbiter 84, then the external arbiter informs the internal arbiter that the internal arbiter can select a new bus request from the hard drive 80 or the CD-ROM drive 82.

In contrast to prior art computer systems, whenever one of the priority bus agents 62–64 receives an I/O grant signal from the external arbiter 90 of the bus controller 66, the priority bus agent can transmit a transaction on the processor bus 12 without having to activate a priority bus request (BPRI#) line on the processor bus. Rather, the external arbiter 90 of the bus controller 66 activates the BPRI# line whenever the external arbiter transmits an I/O grant signal to one of the priority bus agents 62–64. In addition, the external arbiter 90 activates the BPRI# line whenever the external arbiter selects the bus request selected by the internal arbiter 84. The external arbiter then transmits the transaction portion of the bus request on the processor bus 52 via an output port 100.

The external arbiter 90 activates the BPRI# line via a BPRI# port 102 coupled to the BPRI# line. An active BPRI# line prevents the symmetric bus agent 54–60 from transmitting a new bus transaction on the processor bus 52. If one of the symmetric bus agents 54–60 is currently transmitting a transaction across the processor bus 52 when the BPRI# line is activated by the bus controller 66, then the symmetric bus agent completes the transaction and then relinquishes control of the processor bus to the bus controller.

Figure 3:
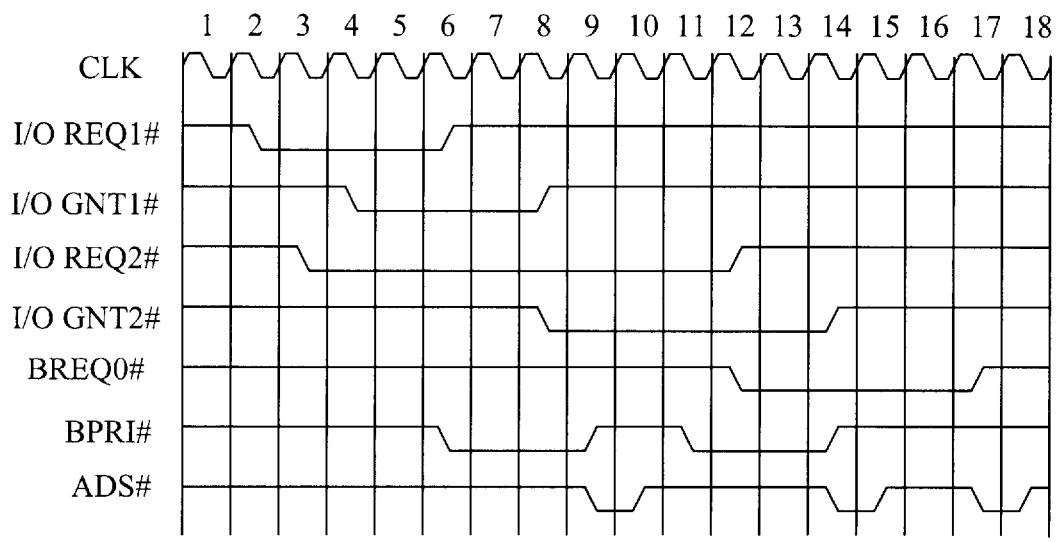
FIG. 3 is a timing diagram illustrating how the prior art computer system shown in FIG. 1 obtains access to a computer bus.
Figure 4:
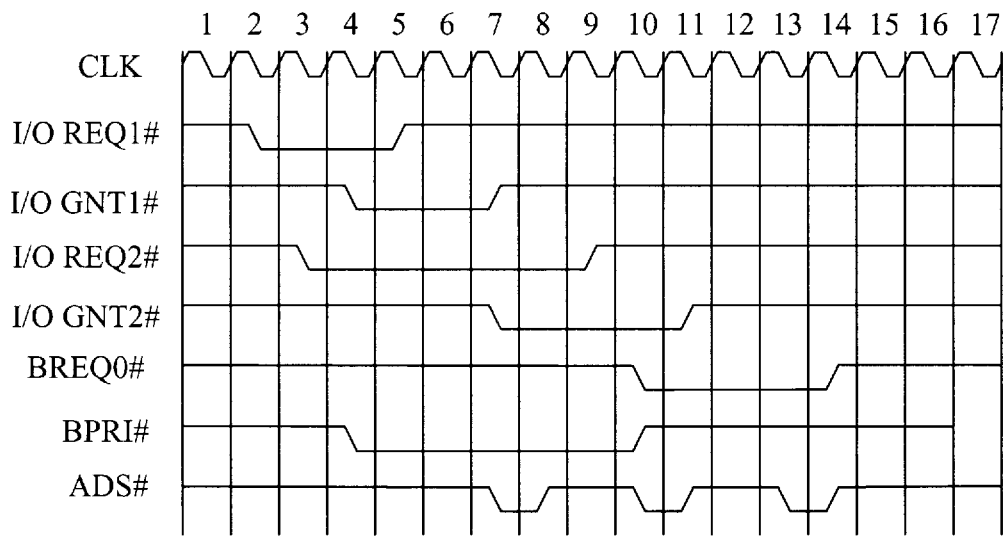
FIG. 4 is a timing diagram illustrating how the computer system shown in FIG. 2 obtains access to a computer bus.

A comparison of the signal timing of the prior art system shown in FIG. 3 with the timing of the present invention shown in FIG. 4 shows the timing efficiency obtained by the present invention. In clock cycle 2 of FIG. 3, a first priority bus agent transmits an I/O request signal (I/O REQ1#) to an external arbiter (all signals in FIGS. 3 and 4 are active at a low level). In clock cycle 3, a second priority bus agent transmits another I/O request signal (I/O REQ2#) to the external arbiter. The external arbiter arbitrates between the two I/O request signals and in clock cycle 4 the external arbiter transmits an I/O grant signal (I/O GNTI#) to the first priority bus requester. In response to receiving the I/O grant signal, the first priority bus agent determines that the BPRI# line is inactive and activates the BPRI# line in clock cycle 6. In addition, the first priority bus agent deactivates its I/O request signal line to indicate that it has no additional bus requests pending. In response, the external arbiter releases the I/O grant signal to the first priority bus agent and transmits an I/O grant signal (I/O GNT2#) to the second priority bus agent in clock cycle 8. In clock cycle 9, the first priority bus agent activates an address strobe (ADS#) to begin transmitting the transaction portion of its bus request on the processor bus. It should be appreciated that the address strobe ADS# establishes the order in which the bus agents transmit transactions. Because the transaction being transmitted is the only transaction pending from the first priority bus agent, the first priority bus agent releases the BPRI# line in clock cycle 9.

In clock cycle 10 the second priority bus agent determines that the BPRI# line is inactive and in clock cycle 11 the second priority bus agent reactivates the BPRI# line. The second priority bus agent also releases its I/O request signal line to indicate that it has no additional bus requests pending. Because it takes a minimum of three clock cycles from the time of activating the BPRI# line until the address strobe ADS# can be activated, the second priority bus agent activates the address strobe ADS# in clock cycle 14. In addition, the second priority bus agent deactivates the BPRI# line in clock cycle 14 which enables one of the symmetric bus requesters to transmit a transaction corresponding to a symmetric bus request signal (BREQ0#) that was transmitted in clock cycle 12. Thus in clock cycle 17, the symmetric bus agent activates the address strobe and transmits its transaction.

The timing diagram shown in FIG. 4 shows how the present invention enables the bus agents to transmit their transactions sooner (as indicated by the address strobe ADS#) than is possible under the prior art system shown in FIG. 3. The timing diagram of FIG. 4 shows the I/O request signals (I/O REQ1# and I/O REQ2#) and the I/O grant signals (I/O GNT1# and I/O GNT2#) being transmitted during the same clock cycles as shown in FIG. 3. However, in clock cycle 4 the external arbiter 90 activates the BPRI# line simultaneously with its transmission of the I/O grant signal to the first priority bus agent 62. Thus, the BPRI# line is activated two clock cycles earlier in the present invention compared to the prior art system shown in FIG. 3 because the first priority bus agent 62 does not need to determine whether the BPRI# line is already active and then reactivate the BPRI# line after receiving the I/O grant signal from the external arbiter 90. As a result, the first priority bus agent 62 transmits the address strobe ADS# in clock cycle 7 which is one clock cycle earlier than the address strobe ADS# was transmitted in FIG. 3. In addition, the external arbiter 90 knows that the second priority bus agent 64 desires to use the processor bus 52 as soon as the first priority bus agent 62 has finished because the second priority bus agent transmitted its I/O request signal in clock cycle 3. As a result, the external arbiter 90 leaves the BPRI# line in the active state until clock cycle 10 in order to enable the second priority bus agent to transmit its transaction after activating the address strobe ADS# in clock cycle 10. Thus, the present invention enables the first and second priority bus agents 62, 64 to transmit address strobes in clock cycles 7 and 10 respectively rather than in clock cycles 8 and 13 like the prior art system in shown in FIG. 3. In addition, the symmetric bus requester can transmit the address strobe ADS# in clock cycle 13 rather than in clock cycle 16.

Figure 5:
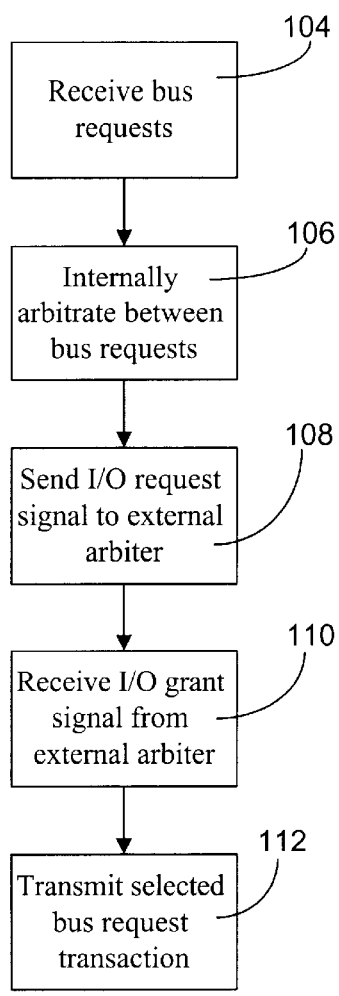
FIG. 5 is a flow diagram of a method performed by a bus agent to obtain access to a computer bus according to the present invention.

Shown in FIG. 5 is a flow diagram of a method performed by either of the priority bus agents 62, 64 to receive and respond to bus requests from the bus requesters 67–78. In step 104, the priority bus agent receives one or more bus requests from one of the bus requesters. In step 106, an internal arbiter of one of priority bus agents 62, 64 internally arbitrates between the bus requests received in step 104 if plural bus requesters are connected directly to the priority bus agent. The computer system shown in FIG. 2 does not show internal arbiters in the priority bus agents 62, 64, but it will be appreciated that such internal arbiters can be provided if plural bus requesters were connected directly to the priority bus agent. If the priority bus agent does not include an internal arbiter, then only a single bus request is received at a time in step 104 and step 106 is skipped. In step 108 the priority bus agent sends an I/O request signal to the external arbiter 90. In step 110, the priority bus agent receives an I/O grant signal from the external arbiter when the external arbiter selects its I/O request signal during arbitration. In step 112, the priority bus agent transmits on the processor bus 52 the bus transaction corresponding to the selected bus request.

Figure 6:
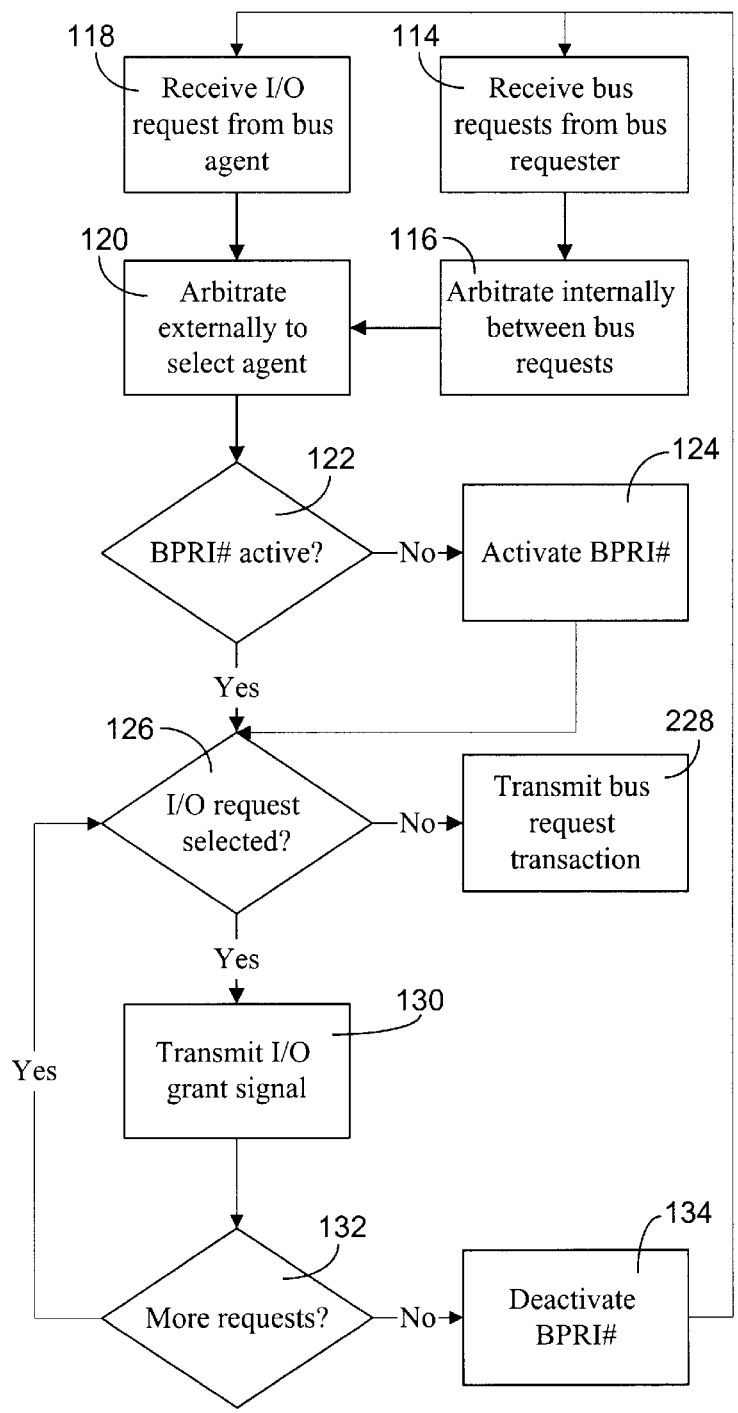
FIG. 6 is a flow diagram of a method performed by a bus controller to grant access to a computer bus according to the present invention.

Shown in FIG. 6 is a method performed by the bus controller 66 to respond to I/O request signals from the priority bus agents 62, 64 or bus requests from the bus requesters 80, 82 connected directly to the bus controller. In step 114, the internal arbiter 84 receives a bus request from each of the bus requesters 80, 82. In step 116 the internal arbiter arbitrates internally between the bus requests received in step 114 and selects one of the bus requests for external arbitration by the external arbiter 90. In step 118, the external arbiter receives one or more I/O request signals from one or more of the priority bus agents 62, 64 and the internal arbiter 84. In step 120, the external arbiter 90 externally arbitrates between the I/O request signals received in step 118 and the bus requests selected in step 116. In step 22, the external arbiter 90 determines whether the BPRI# line of the processor bus 52 is active. Of course, because the bus controller 66 is the only bus agent that activates the BPRI# line in the present invention, the bus controller 66 can simply store an indication of whether the bus controller most recently activated or deactivated the BPRI# line rather than physically checking the status of the BPRI# line. If the BPRI# line is not active, then in step 124 the external arbiter activates the BPRI# line. If the BPRI# line is already active or was activated in step 124, then in step 126 the external arbiter determines whether an I/O request signal from one of the priority bus agents 62, 64 was selected. If not, then the external arbiter 90 must have selected the bus request from the internal arbiter 84 and the external arbiter transmits on the processor bus 52 the transaction corresponding to the selected bus request in step 128. If an I/O request signal was selected, then in step 130 the external arbiter transmits an I/O grant signal to the priority bus agent that transmitted the selected I/O request signal. The I/O grant signal transmitted in step 130 enables the priority bus agent to transmit the transaction corresponding to the selected bus request in step 112 of FIG. 5 without requiring the priority bus agent to check or activate the BPRI# line.

After transmitting a bus request transaction in step 128 or transmitting the I/O grant signal in step 130, the external arbiter 90 determines whether there are any more I/O request signals from the priority bus agents 62–64 or bus requests from the internal arbiter 84 in step 134. If so, then the method repeats steps 126 and 128 or 126 and 130 for the remaining requests. When the external arbiter 90 determines, in step 132, that there are no more requests, then in step 134 the external arbiter 90 deactivates the BPRI# line and waits until new bus requests are received in step 114 or new I/O request signals are received in step 118.

Based on the foregoing discussion, it will be appreciated that the present invention provides a method, system, and bus controller that more efficiently enable a priority bus agent to access a computer bus faster than in prior art systems and methods. In particular, the invention activates a priority bus request line on the computer bus from a single bus controller regardless of which priority bus agent is transmitting a transaction on the computer bus. Activating the priority bus request line from the bus controller enables a transaction from a first priority bus agent to be immediately followed by a transaction from a second priority bus agent without requiring the first priority bus agent to deactivate the priority bus request line and without requiring the second priority bus agent to reactivate the priority bus request line. Moreover, by activating the priority bus request line at the bus controller simultaneously with the transmission of a bus grant signal to one of the priority bus agents, the invention enables the priority bus agent to transmit a transaction on the computer bus two clock cycles faster than prior art systems which require the priority bus agent to activate the priority bus request line after receiving the bus agent signal.

It should be understood that even though numerous advantages of the present invention have been set forth in the foregoing description, the above disclosure is illustrative only. Changes may be made in detail and yet remain within the broad principles of the present invention.

I claim:

1. A computer system for controlling access to a computer bus, comprising:

a first bus agent directly coupled to the computer bus, the first bus agent being structured to transmit an I/O request signal and, in response to receiving an I/O grant signal, transmit a transaction directly on the computer bus without needing the first bus agent to activate a priority bus request line on the computer bus; and a bus controller coupled to the first bus agent by the computer bus, the bus controller being structured to receive the I/O request signal from the first bus agent and, in response, activate the priority bus request line to an active state on the computer bus and transmit the I/O grant signal to the first bus agent.

2. The computer system of claim 1 wherein the bus controller includes:

a first I/O request port for receiving the I/O request signal from the first bus agent;

a priority bus request port for activating the priority bus request line of the computer bus; and a first I/O grant port for transmitting the I/O grant signal to the first bus agent in response to the I/O request signal.

3. The computer system of claim 1, further comprising:

a bus arbiter for transmitting the I/O grant signal and activating the priority bus request line in response to receiving the I/O request signal, such that the first bus agent can transmit the bus transaction on the computer bus.

4. The computer system of claim 3, further including:

a second bus agent structured to transmit an I/O request signal to the bus controller, wherein the bus arbiter is structured to arbitrate between the I/O request signals received from the first and second bus agents and transmit the I/O grant signal to the first bus agent in response to selecting the first bus agent during arbitrating between the I/O request signals.

5. The computer system of claim 3, further including:

a bus requester structured to transmit a bus request to the bus controller, wherein the bus controller includes a requester input port for receiving the bus request from the bus requester and the bus arbiter is structured to arbitrate between the I/O request signal and the bus request before transmitting the I/O grant signal to the first bus agent.

6. The computer system of claim 1, further including:

an input device for inputting data to the first bus agent; and an output device for outputting data from the first bus agent.

7. A bus controller for controlling access to a computer bus, comprising:

a first bus request port for receiving a bus request from a first bus requester;

a second bus request port for receiving a bus request from a second bus requester;

an internal bus arbiter for arbitrating between the bus requests from the first and second bus requesters, the internal bus requester being structured to transmit an indication that the bus request from the first bus requester was selected during arbitrating between the bus requests; a first I/O request port for receiving an I/O request signal from a first bus agent;

a priority bus request port for activating a priority bus request line of the computer bus;

a first I/O grant port for transmitting an I/O grant signal to the first bus agent in response to the I/O request signal from the first bus agent; and an external bus arbiter structured to receive the indication from the internal bus arbiter, arbitrate between the first bus request and the I/O request signal, transmit the I/O grant signal to the first bus agent via the I/O grant port, and activate the priority bus request line via the priority bus request port in response to selecting the I/O request signal during arbitration, such that the first bus agent can directly transmit on the computer bus a bus transaction corresponding, to the I/O request signal.

8. The bus controller of claim 7, further comprising:

a second I/O port for receiving an I/O request signal from a second bus agent, wherein the external bus arbiter is structured to arbitrate between the I/O request signals received from the first and second bus agents and transmit the I/O grant signal to the first bus agent in response to selecting the first bus agent during arbitrating between the I/O request signals.

9. A computer system for controlling access to a computer bus, the computer bus including a priority bus request line, the computer system comprising:

a first bus agent directly coupled to the computer bus, the first bus agent being structured to transmit an I/O request signal and, in response to receiving an I/O grant signal, transmit a transaction directly on the computer bus; and a bus controller coupled to the first bus agent by the computer bus, the bus controller including:

a first bus request port for receiving a bus request from a first bus requester;

a second bus request port for receiving a bus request from a second bus requester;

an internal bus arbiter for arbitrating between the bus requests from the first and second bus requesters, the internal bus requester being structured to transmit an indication that the bus request from the first bus requester was selected during arbitrating between the bus requests;

a priority bus request port for activating the priority bus request line of the computer bus; and an external bus arbiter structured to receive the indication from the internal bus arbiter, arbitrate between the first bus request and the I/O request signal, transmit the I/O grant signal to the first bus agent, and activate the priority bus request line via the priority bus request port in response to selecting the I/O request signal during arbitration, such that the first bus agent can directly transmit on the computer bus a bus transaction corresponding to the I/O request signal.

10. The computer system of claim 9, further including:

a second bus agent structured to transmit an I/O request signal to the bus controller, wherein the bus arbiter is structured to arbitrate between the I/O request signals received from the first and second bus agents and transmit the I/O grant signal to the first bus agent in response to selecting the first bus agent during arbitrating between the I/O request signals.

11. The computer system of claim 9, further including the first and second bus requesters.

\* \* \* \* \*